United States Patent [19]
Watanabe

[11] Patent Number: 6,075,762
[45] Date of Patent: Jun. 13, 2000

[54] DISC DRIVE APPARATUS

[75] Inventor: Tetsu Watanabe, Tokyo, Japan

[73] Assignee: Sony Corporation, Tokyo, Japan

[21] Appl. No.: 09/076,386

[22] Filed: May 12, 1998

[30] Foreign Application Priority Data

May 16, 1997 [JP] Japan .................................... 9-127020

[51] Int. Cl.$^7$ .................................................. G11B 7/00
[52] U.S. Cl. ............................... 369/54; 369/121; 369/53
[58] Field of Search .................................... 369/44.37, 54, 369/56, 53, 121

[56] References Cited

U.S. PATENT DOCUMENTS 5,267,226  11/1993  Matsuoka et al. .................... 369/44.11
5,808,991   9/1998  Inoue ................................... 369/44.38

*Primary Examiner*—Nabil Hindi
*Attorney, Agent, or Firm*—Limbach & Limbach L.L.P.

[57] ABSTRACT

An optical pickup is provided with a main beam for performing recording or playback on a disc and an advance beam in a position ahead of this main beam to detect the surface state of the disc; the surface state of the disc is detected on the basis of the light reception information (an MO signal or an RF signal) of this advance beam; and control is so effected that, at the timing of the main beam passing the position where adhesion of dust or the like to the disc is detected, the laser output power of the main beam reach a level at which satisfactory operation can be executed even if there is dust adhesion or the like so as to make possible execution of accurate recording and playback operations, even if the thickness of a disc-shaped recording medium is thinned, without being affected by dust or the like stuck to the surface of the disc-shaped recording medium.

7 Claims, 8 Drawing Sheets

FIG. IA
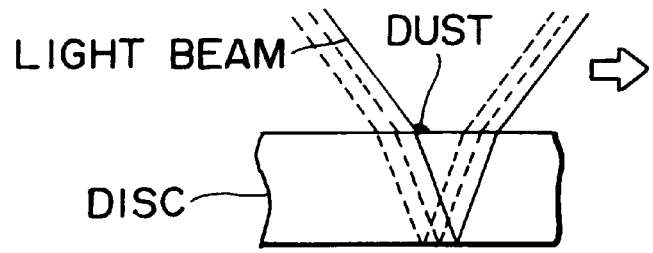
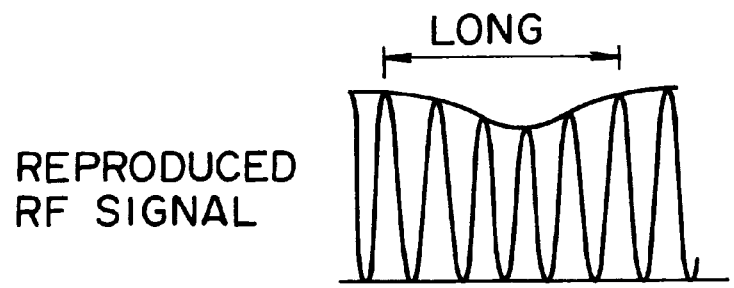
FIG. IB
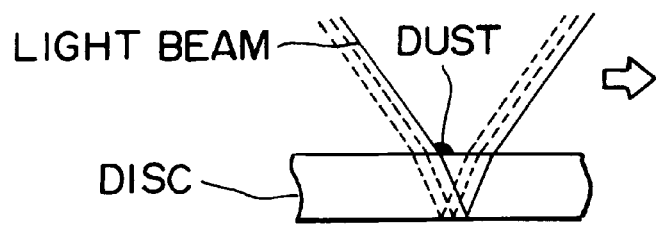
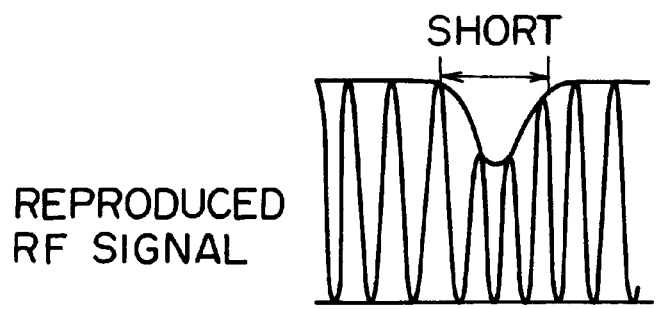

←—DIRECTION OF SCANNING

DISC DRIVE APPARATUS

BACKGROUND OF THE INVENTION

1. Field of the Invention

The present invention relates to a disc drive apparatus capable of executing recording and playback operations on a disc-shaped recording medium.

2. Description of Related Art

As disc-shaped recording media, optical discs, magneto-optic discs (MO discs), phase change discs (PC discs) and so forth have been developed.

Whereas optical discs used in various fields, such as CDs (compact discs), are required to be 1.2 mm in thickness, along with the size contraction of discs in recent years, magneto-optic discs known as HS (hyper storage) discs are required to be 0.8 mm in thickness, and DVDs (digital versatile discs/digital video discs), which are suitable for multimedia use, are required to be 0.6 mm in thickness. Furthermore, development of disc-shaped recording media of 0.1 mm or 0.01 mm in disc thickness is under way.

However, if the thickness of a disc-shaped recording medium is made thinner than 1.2 mm, the influence of dust or the like sticking to the disc surface increases, and gives rise to the problem that it is made difficult for the disc drive apparatus to execute accurate recording and playback operations.

Hereupon, with reference to FIGS. 1A and 1B and FIG. 2, explanation will be made of reading errors which may be invited by the influence of disc thickness and dust stuck to the disc when playback is executed by a conventional disc drive apparatus.

FIG. 1 illustrates the waveforms of reproduced RF signals obtained by a disc drive apparatus when dust of a certain magnitude is stuck to the surface of a disc, FIG. 1A showing the waveform of a reproduced RF signal obtained when dust of a certain magnitude is stuck to the surface of a disc having a thickness of 1.2 mm. In this case, though the level of the reproduced RF signal is somewhat reduced by the influence of the dust stuck to the surface of the disc, no level drop heavy enough to invite a reading error in the disc drive apparatus occurred.

On the other hand, FIG. 1B shows the waveform of a reproduced RF signal obtained by the disc drive apparatus when dust of the same magnitude as in FIG. 1A is stuck to the surface of a disc having a thickness of, for example, 0.6 mm. In this case, as the cross section of the light beam coming incident from the disc drive apparatus on the disc becomes smaller and, where dust or the like of the same size as in FIG. 1A is stuck to the surface of the disc, the proportion of the dust per unit area becomes greater, the level of the reproduced RF signal obtained by the disc drive apparatus steeply drops in a short period of time under the influence of the dust sticking to the disc surface, resulting in a situation in which the disc drive apparatus is highly likely to commit a reading error.

FIG. 2 illustrates the relationship between the thickness of the disc and the size of dust stuck to the disc on the one hand and the quantity of error propagation in the disc drive apparatus on the other. Incidentally, in FIG. 2, a drop in the level of a reproduced RF signal obtained by the disc drive apparatus to 55% or less of the normal level when no dust or the like is stuck is supposed to be an error level. To add, this error level is no more than an example, and the error level is supposed to differ from one disc drive apparatus system to another.

It is seen from this FIG. 2 that, even when the size of dust stuck to the surface of the disc is small, reading errors become more likely to occur as the thickness of the disc decreases from 1.2 mm to 0.60 mm, 0.30 mm, 0.15 mm and 0.02 mm.

Then, in order to prevent the influence of dust or the like stuck to the surface of disc from inviting a drop in the level of reproduced RF signals obtained by a disc drive apparatus even when the thickness of the disc is reduced, it is conceivable to provide the disc drive apparatus with an auto gain control (AGC) circuit to amplify the reproduced RF signals obtained by the disc drive apparatus to a prescribed level.

However, there was the problem that, if the disc drive apparatus is provided with an AGC circuit and the reproduced RF signals are amplified to a prescribed level, as the AGC circuit would also amplify amplifier noise and the like contained in the reproduced RF signals, the carrier-to-noise (C/N) ratio would deteriorate.

Also, it was difficult to correct the recording level with the AGC circuit during the recording operation of the disc drive apparatus.

SUMMARY OF THE INVENTION

Therefore, the present invention has been attempted to solve these problems, and its object is to provide a disc drive apparatus capable of executing accurate recording and playback operations, even if the thickness of the disc-shaped recording medium is thinned, without being affected by dust or the like stuck to the surface of the disc-shaped recording medium.

In order to achieve the above-stated object, as a disc drive apparatus for performing recording, playback or deletion on a disc-shaped recording medium, it is so disposed as to provide first light beam means for forming a first light spot for performing recording, playback or deletion on a disc-shaped recording medium; second light beam means for forming a second light spot in a scanning position ahead of the first light spot to detect the surface state of the disc-shaped recording medium; disc state detecting means for detecting the surface state of the disc-shaped recording medium on the basis of reception information on the reflected light of the second light beam means; and level control means for correctively controlling the laser output level of the first light beam means with a difference in the timing of scanning of the disc-shaped recording medium by the first light spot and the second light spot according to the surface state of the disc-shaped recording medium detected by the disc state detecting means.

Further, for the reception information on the reflected light of the second light beam means, either information corresponding to information on a magnetic field formed on the disc-shaped recording medium or information on the quantity of light reflected by the disc-shaped recording medium is used.

Also, the level control means is provided with a conversion table for ensuring the respective optimal level for the laser output of the first light beam means in recording, playback or deleting operation.

Furthermore, the first light beam means and the second light beam means consist of one laser beam emitting source and spectral means for dividing the laser beam from this laser beam emitting source.

And, when the laser output of the first light beam means is being correctively controlled by the level control means, either correction at the detection level is performed by the disc state detecting means, or the disc state detecting means is stopped.

According to the invention, as the second light beam means for forming the second light spot for detecting the surface state of the disc-shaped recording medium is provided in a position ahead of the first light spot of the first light beam means for performing recording, playback or deletion on the disc-shaped recording medium, and the surface state of the disc-shaped recording medium is detected on the basis of reception information on the reflected light of this second light beam means, it is possible to correctively control the laser output of the first light beam means to reach a prescribed level (e.g. a level at which satisfactory operation can be executed even if there is dust adhesion or the like) at the timing of passing a certain position (e.g. the position of detection of dust adhesion or the like) detected by the disc state detecting means on the disc-shaped recording medium.

BRIEF DESCRIPTION OF THE DRAWINGS

FIGS. 1A and 1B are diagrams illustrating the waveforms of reproduced RF signals obtained by a disc drive apparatus when dust of a certain magnitude is stuck to the surface of a disc.

DESCRIPTION OF THE PREFERRED EMBODIMENTS

Figure 2:
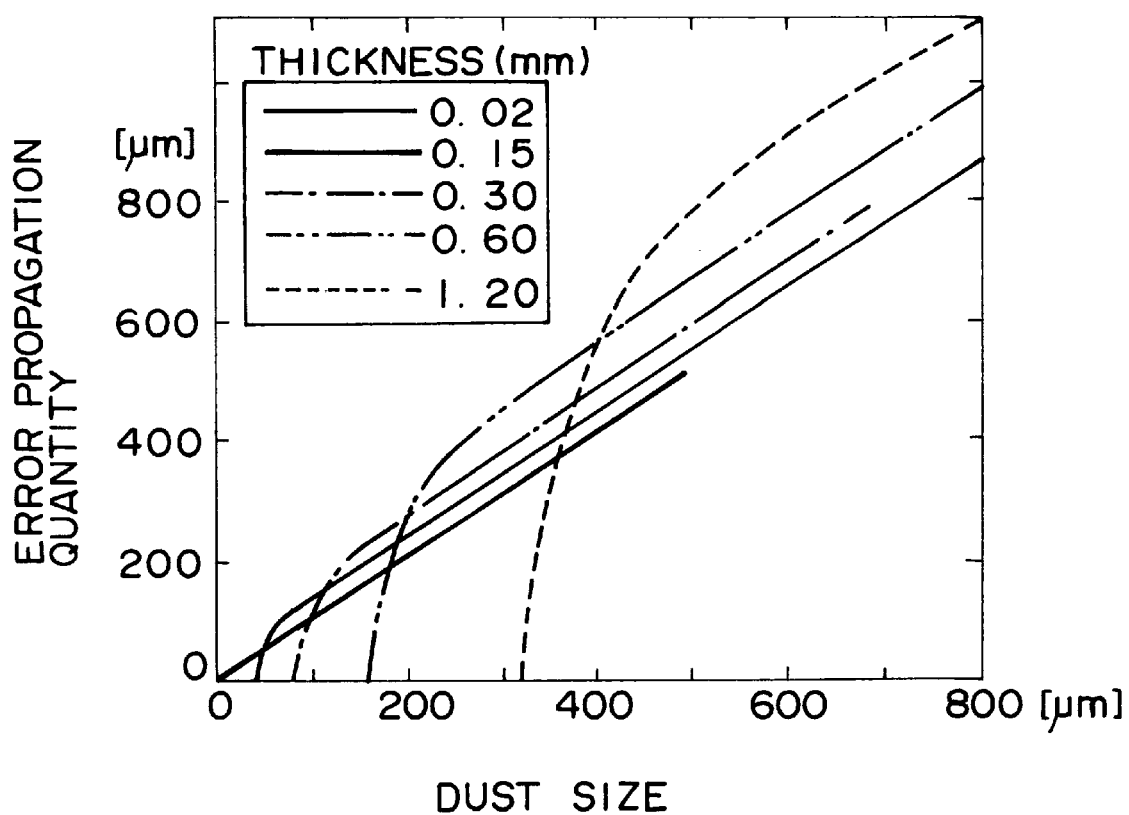
FIG. 2 is a diagram illustrating the relationship between the thickness of the disc and the size of dust stuck to the disc on the one hand and errors in the disc drive apparatus on the other.
Figure 3:
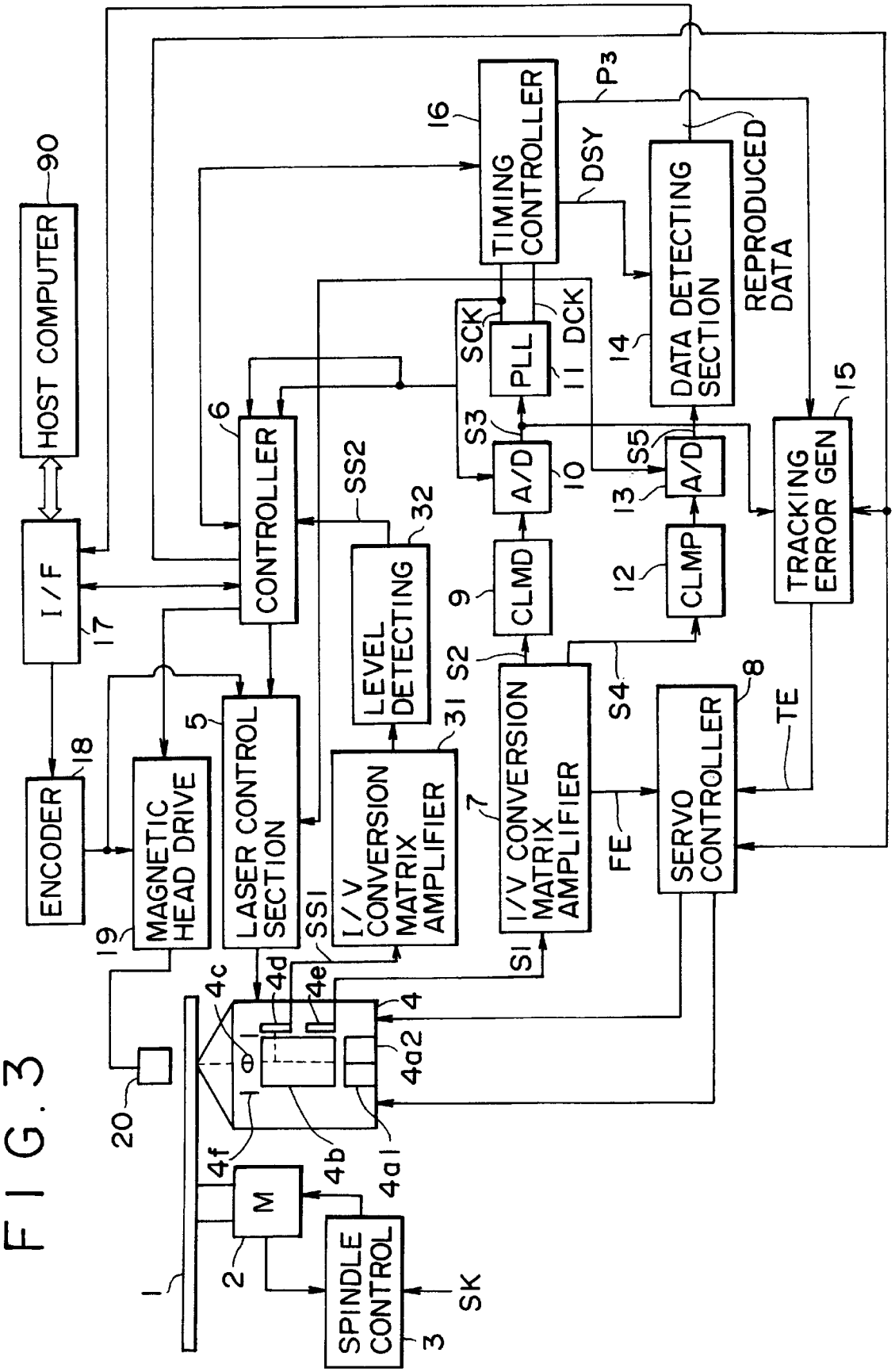
FIG. 3 is a block diagram of a disc drive apparatus in this mode of implementation.

FIG. 3 shows a block diagram of a disc drive apparatus as a mode of implementing the present invention.

A disc 1 shown in this diagram is a magneto-optic disc (MO disc), and this disc 1 is rotationally driven by a spindle motor 2 at a prescribed number of revolutions. Servo control of the rotational speed of the spindle motor 2 is accomplished by a spindle control section 3. For instance, the spindle control section 3 detects the rotational speed of the spindle motor 2 by an FG pulse (a frequency signal synchronized with the rotational speed) or the like from the spindle motor 2, at the same time is supplied with reference speed information SK from a controller 6, compares the reference speed information SK and the rotational speed of the spindle motor 2, accelerates or decelerates the spindle motor 2 on the basis of that error information, and thereby realizes disc rotating operation at a required rotational speed.

The rotating disc 1 is irradiated with a laser beam from an optical pickup 4. The optical pickup 4 of the disc drive apparatus in this mode of implementation is provided with two laser beam sources $4a_1$ and $4a_2$ for emitting, for instance, a main beam for performing recording and playback on the disc 1 and an advance beam ahead of this main beam. The laser beam sources $4a_1$ and $4a_2$ consist of diodes, laser couplers or the like. There are further provided, among other things, an optical system 4b having various lenses, beam splitters and so forth for both laser beam sources $4a_1$ and $4a_2$, an object glass 4c constituting the output end of the laser beams, a detector 4d for detecting the reflected light of the advance beam, a detector 4e for detecting the reflected light of the main beam, and a twin-shaft mechanism 4f for holding the object glass 4c movable in the tracking direction and the focusing direction.

Turning on/off and output level control of laser outputs from the laser beam sources $4a_1$ and $4a_2$ of the optical pickup 4 are accomplished by a laser control section 5.

Figure 4:
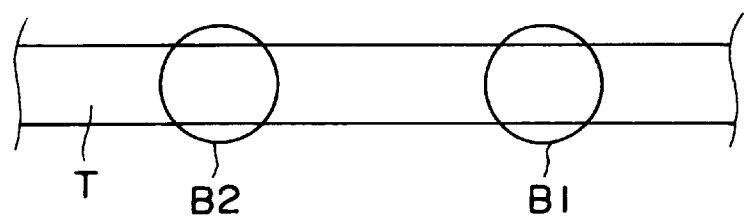
FIG. 4 is a diagram illustrating the arrangement of light spots emitted from the optical pickup 4 on the track in this mode of implementation.

By this optical pickup 4, a track T on the disc is irradiated with two beams (the main beam B1 and the advance beam B2) as illustrated in FIG. 4.

Incidentally, the advance beam B2 need not in a completely on-track state, but may be off the track center Whereas this disc drive apparatus is connected to a host computer 90 by way of its interface section 17, data recording/playback operations are executed as the controller 6 receives recording requests and playback requests from the host computer 90.

During recording, data to be recorded, together with a recording request, are supplied from the host computer 90. Record data $D_{REC}$ are supplied from the interface section 17 to an encoder 18, and required encode processing takes place.

The recording system of the disc drive apparatus is supposed to be, for instance, a laser strobe magnetic field modulation system, and in the case of this recording system, the controller 6, during recording, performs control over the laser control section 5 so as to have the laser output emitted as main beam emit light in pulses at a prescribed level, but the controller 6 of the disc drive apparatus in this mode of implementation further detects the advance beam emitted from the laser beam source $4a_2$, to be described below, with a laser detecting section 32 and, on the basis of its detection result, correctively controls the laser output emitted from the laser beam source $4a_1$ as main beam by a prescribed level. As regards the method of correcting the laser output by the laser control section 5, it can be realized by simply increasing the laser output power or extending the pulse width Record data encoded by the encoder 18 are supplied to a magnetic head driver 19, and the magnetic head driver 19 impresses a magnetic field of N or S according to the record data from a magnetic head 20. The record data are thereby recorded on the disc 1 as magnetic field information.

The position of data reading by the optical pickup 4 is supposed to be movable in the radial direction. Though not specifically illustrated, a sled mechanism to make the whole optical pickup 4 movable in the radial direction of the disc is provided, and this takes charge of large moments of the reading position, and at the same time the object glass 4c is moved by the twin-shaft mechanism 4f in the radial direction of the disc. Thus, minor movements of the reading position are accomplished by tracking servo operation.

Incidentally, in place of the sled mechanism to shift the optical pickup 4, there may as well be provided a mechanism to slide the disc 1 together with the spindle motor 2.

Furthermore, the shifting of the object glass 4c by the twin-shaft mechanism 4f in a direction away from the disc 1 accomplishes focusing control of the laser spot.

What are provided as detectors 4d and 4e of the optical pickup 4 include, for example, quadrisected detectors having a quadrisected light receiving area, detectors which detect magnetic field data with respect to each component polarized by the magnetic Kerr effect and obtain signals as photomagnetic data.

From each light receiving area of the detector 43, a received luminous energy signal S1, which is supposed to be an electric current signal corresponding to the received luminous energy of the main beam, is outputted, and these signals are supplied to an I/V conversion matrix amplifier 7. The I/V conversion matrix amplifier 7, besides performing current/voltage conversion for the received luminous energy signals S1, carries out arithmetic processing of the received luminous energy signal S1 from each light receiving area to generate necessary signals including signals corresponding to magnetic data, signals corresponding to bit data (e.g. signals in phase bits provided in the servo area of the disc 1 and elsewhere), push-pull signals and focus error signals FE.

The focus error signal FE, which serves as information on any error in the focusing state, is supplied to a servo controller 8. The servo controller 8, mounted with a focus phase compensating circuit, a focus driver and so forth as processing section for the focusing system, generates a focus drive signal based on the focus error signal FE, and impresses it on a focus coil of the twin-shaft mechanism 4f. A focus servo system to converge the object glass 4c on the just in-focus point is thereby configured.

From the I/V conversion matrix amplifier 7 is outputted a signal S2 for use in the generation of servo clocks SCK and data clocks DCK. This signal S2 is a signal, for instance, extracted from the servo area of the disc 1.

Said signal S2 is cleared of low frequency fluctuations by a clamping circuit 9, and turned into a digitized signal S3 by an A/D converter 10.

This signal S3 is supplied to the controller 6, a PLL circuit 11 and a tracking error generating section 15.

The PPL circuit 11 generates the servo clock SCK by controlling the oscillation frequency of an internal oscillator on the basis of a phase error between the signal S3 and the oscillation output and performing prescribed frequency division. This servo clock SCK is used as sampling clock by the A/D converter 10, and at the same time supplied to a timing controller 16. The PLL circuit 11 also generates the data clock by frequency-dividing the servo clock SCK, and supplies it to the timing controller 16 and the laser control section 5. It is also used as sampling clock by the A/D converter 13.

The timing controller 16 generates necessary timing signals for various sections on the basis of the servo clock SCK and the data clock DCK.

It generates, for instance, a sampling timing Ps for extracting a servo bit for three-phase tracking operation and a synchronization timing DSY for decoding operation by a data detecting section 14, among other things.

The PLL circuit 11, the timing controller 16 and the tracking error generating section 15 generate a tracking error signal TE under so-called three-phase tracking control, and supply it to the servo controller 8.

From the I/V conversion matrix amplifier 7 are outputted a photomagnetic area reading signal to be used for data extraction, a push-pull signal and so forth as signal S4. This signal S4 are cleared of low frequency fluctuations of MO signals by a clamping circuit 12, and turned into a digitized signal S5 by an A/D converter 13.

Further, the signal S5 is supplied to the data detecting section (i.e. decoder) 14. In the data detecting section 14, data decode processing is performed on the basis of the synchronization timing DSY, which is generated by the timing controller 16 on the basis of the data clock DCK, and reproduced data $D_{PB}$ are obtained. For instance, waveform equalization processing, demodulation processing against the modulation processing adopted as recording format, error correction processing and so forth are carried out to encode the reproduced data $D_{PB}$ as such.

These reproduced data $D_{PB}$ are supplied to the host computer 90 via the interface section 17.

On the other hand, from each light receiving area of the detector 4d of the optical pickup 4 is outputted a received luminous energy signal SS1, which is supposed to be an electric current signal corresponding to the received luminous energy of the advance beam, and these signals are supplied to an I/V conversion matrix amplifier 31. The I/V conversion matrix amplifier 31, besides performing current/voltage conversion for the received luminous energy signals SS1, carries out prescribed arithmetic processing of the received luminous energy signal SS1 from each light receiving area to generate necessary signals including signals corresponding to magnetic data, signals corresponding to bit data and push-pull signals.

In this specification, for the convenience of description, of the signals outputted from the I/V conversion matrix amplifiers 31 and 7, those obtained by the magnetic Kerr effect detection system shall be referred to as MO signals, and those obtained by the reflected luminous energy detection system as RF signals, irrespective of the data form (phase bit data or photomagnetic data) of their origins on the disc.

The level detecting section 32 detects the output levels of MO signals and RF signals, generated by the IV conversion matrix amplifier 32 from the advance beam, and of push-pull signals, and outputs them to the controller 6.

Figure 5A:
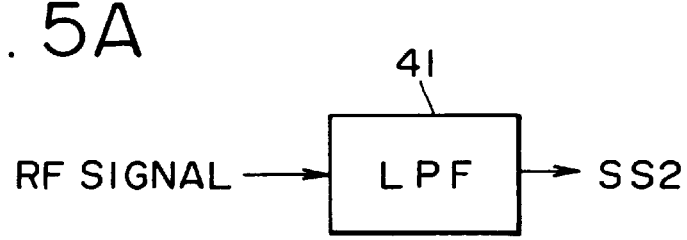
FIGS. 5A and 5B are block diagrams illustrating the configuration of the level detection section of the disc drive apparatus in this mode of implementation.
Figure 5B:
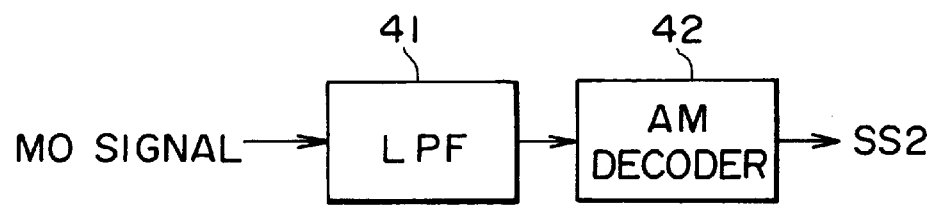

FIGS. 5A and 5B illustrates the configuration of the level detecting section 32; where, for instance, the level of an RF signal supplied from the I/V conversion matrix amplifier 31 is to be detected by the level detecting section 32, a low pass filter circuit 41 to remove the noise content contained in the RF signal is provided as shown in FIG. 5A.

Or where, for instance, the level of an MO signal supplied from the I/V conversion matrix amplifier 31 is to be detected by the level detecting section 32, the low pass filter circuit 41 to remove the noise content contained in the MO signal and an AM decoder 42 to detect the envelope of the MO signal are provided as shown in FIG. 5B.

Figure 6A:
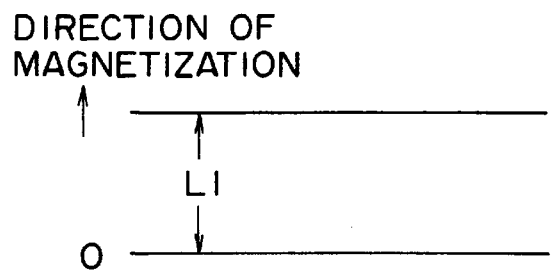
FIGS. 6A and 6B are diagrams illustrating the waveform of an MO signal generated from the advance beam during recording operation in the disc drive apparatus in this mode of implementation.
Figure 6B:
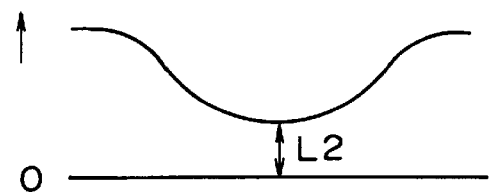

FIGS. 6A and 6B show the waveforms of an MO signal generated by the I/V matrix amplifier 31 on the basis of reflected light resulting from the reflection of the advance beam, emitted from the laser light source $4a_2$ of the optical pickup 4 during recording operation, by the disc 1 in the disc drive apparatus in this mode of implementation, FIG. 6A showing the waveform of the MO signal when dust or the like is not stuck to the disc 1 and FIG. 6B, that of the MO signal when dust or the like is stuck to the disc 1.

In recording operation, an MO signal generated by the I/V conversion matrix amplifier 31 when no dust or the like was stuck to the disc 1 was observed to take a constant level L1 when the magnetic field bits of the unrecorded area of the disc 1 were magnetized in the direction of the arrow (the+ direction) as shown in FIG. 6A, because the signal was generated by utilizing the Kerr effect of the light reflected by the unrecorded area of the disc 1.

On the other hand, in recording operation, an MO signal generated by the I/V conversion matrix amplifier 31 when dust or the like was stuck to the disc 1 was observed to be reduced to a level L2 by the dust or the like stuck to the surface of the disc 1 as shown in FIG. 6B.

Therefore, in recording operation, it is possible to assess the disc state as to whether or not dust, smear or the like is stuck to the disc 1 by detecting the level of an MO signal generated by the I/V conversion matrix amplifier 31.

Figure 7A:
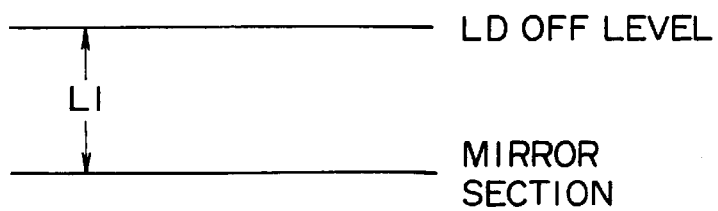
FIGS. 7A and 7B are diagrams illustrating the waveform of an RF signal generated from the advance beam during recording operation in the disc drive apparatus in this mode of implementation.
Figure 7B:
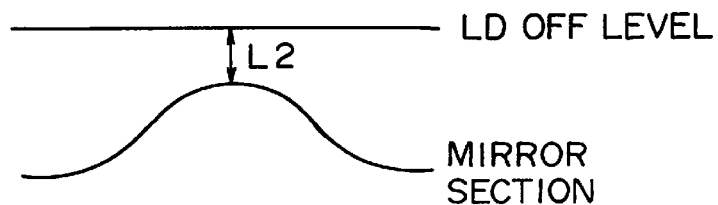

Further, FIGS. 7A and 7B show the waveforms of an RF signal generated by the I/V matrix amplifier 31 on the basis of reflected light resulting from the reflection of the advance beam, emitted from the laser light source $4a_2$ of the optical pickup 4 during recording operation, FIG. 7A showing the waveform of the RF signal when dust or the like is not stuck to the disc 1 and FIG. 7B, that of the RF signal when dust or the like is stuck to the disc 1.

In recording operation, an RF signal generated by the I/V conversion matrix amplifier 31 when no dust or the like was stuck to the disc 1 was observed to take a constant level L1 with reference to the off-level of the laser output emitted from the laser diode (LD) of the laser light source $4a_2$ as shown in FIG. 7A.

On the other hand, in recording operation, an RF signal generated by the I/V conversion matrix amplifier 31 when dust or the like was stuck to the disc 1 was observed to be reduced to a level L2 with reference to the off-level of the laser output emitted from the laser diode (LD) by the dust or the like stuck to the surface of the disc 1 as shown in FIG. 7B.

Therefore, in recording operation, it is possible to assess the disc state as to whether or not dust, smear or the like is stuck to the disc 1 by detecting the level of an RF signal generated by the I/V conversion matrix amplifier 31.

Figure 8A:
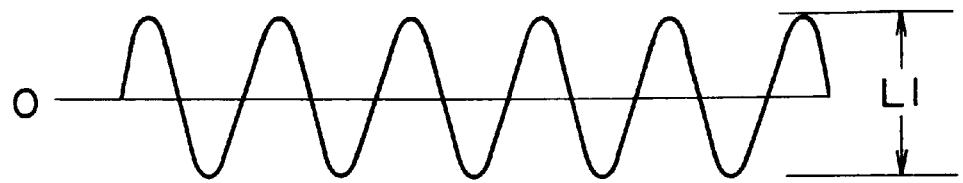
FIGS. 8A and 8B are diagrams illustrating the waveform of an MO signal generated from the advance beam during playback operation in the disc drive apparatus in this mode of implementation.
Figure 8B:
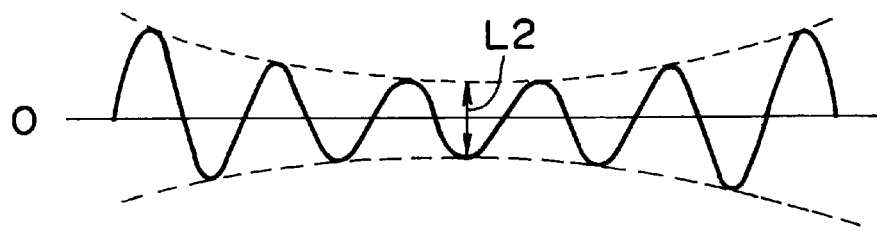

Next, FIGS. 8A and 8B show the waveforms of an MO signal generated by the I/V matrix amplifier 31 on the basis of reflected light resulting from the reflection of the advance beam, emitted from the laser light source $4a_2$ of the optical pickup 4 during playback operation, in the disc drive apparatus in this mode of implementation, FIG. 8A showing the waveform of the MO signal when dust or the like is not stuck to the disc 1 and FIG. 8B, that of the MO signal when dust or the like is stuck to the disc 1.

In playback operation, an MO signal generated by the I/V conversion matrix amplifier 31 when no dust or the like was stuck to the disc 1 was observed to take an amplitude level L1 as shown in FIG. 8A.

On the other hand, an MO signal generated by the I/V conversion matrix amplifier 31 when dust or the like was stuck to the disc 1 was observed to be reduced to an amplitude level L2 by the dust or the like stuck to the surface of the disc 1 as shown in FIG. 8B.

Therefore, in playback operation as well, it is possible to assess the disc state as to whether or not dust, smear or the like is stuck to the disc 1 by detecting the level of an MO signal generated by the I/V conversion matrix amplifier 31.

Figure 9A:
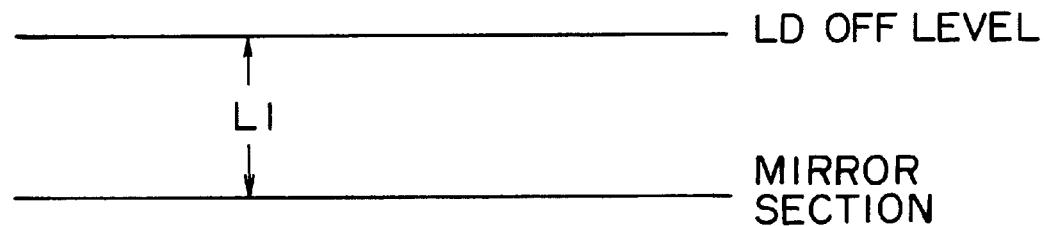
FIGS. 9A and 9B are diagrams illustrating the waveform of an RF signal generated from the advance beam during playback operation in the disc drive apparatus in this mode of implementation.
Figure 9B:
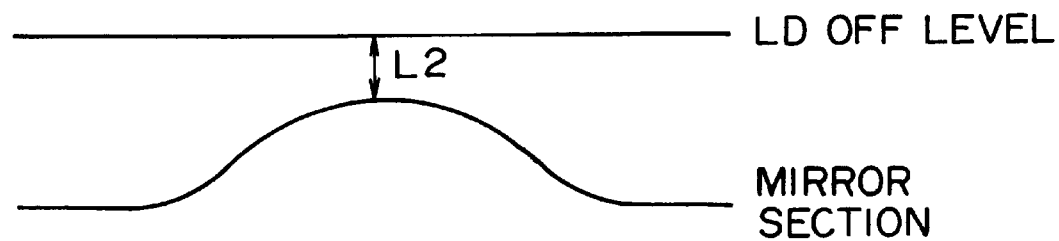

Further, FIGS. 9A and 9B show the waveforms of an RF signal generated by the I/V matrix amplifier 31 on the basis of reflected light resulting from the reflection of the advance beam, emitted from the laser light source $4a_2$ of the optical pickup 4 during playback operation, FIG. 9A showing the waveform of the RF signal when dust or the like is not stuck to the disc 1 and FIG. 9B, that of the RF signal when dust or the like is stuck to the disc 1.

In playback operation, an RF signal generated by the I/V conversion matrix amplifier 31 showed a similar waveform to FIG. 7 above since it has nothing to do with the presence or absence of magnetic field bits of the disc 1 and, when no dust or the like was stuck to the disc 1, was observed to take a constant level L1 as shown in FIG. 9A.

On the other hand, an RF signal generated by the I/V conversion matrix amplifier 31 when dust or the like was stuck to the disc 1 was observed to be reduced to a level L2 by the influence of dust stuck to the surface of the disc 1 as shown in FIG. 9B.

Thus, in playback operation as well, it is possible to assess the disc state as to whether or not dust, smear or the like is stuck to the disc 1 by detecting the level of an RF signal generated by the I/V conversion matrix amplifier 31.

Therefore, in the disc drive apparatus in this mode of implementation, an MO signal or an RF signal is generated by the I/V conversion matrix amplifier 31 on the basis of the reflected light of the advance beam emitted from the optical pickup 4, and this generated MO signal or RF signal is supplied to the level detecting section 32. The level detecting section 32 detects the level of the MO signal or the RF signal, and supplies it as detection signal SS2 to the controller 6. And it is so disposed that, on the basis of the detection signal SS2 from the level detecting section 32, the output power level of the laser beam emitted as main beam from the laser light source $4a_1$ of the optical pickup 4, which is controlled by the laser control section 5, is corrected.

Thus, since the level of MO signals generated by the I/V conversion matrix amplifier 7 from the main beam also drops when dust or the like is stuck to the surface of the disc 1, it is so disposed that the laser output power level of the main beam emitted from the laser light source $4a_1$ be corrected upward by a prescribed level at the timing of the passage of the main beam through the area of dust or the like stuck to the surface of the disc 1.

Figure 10:
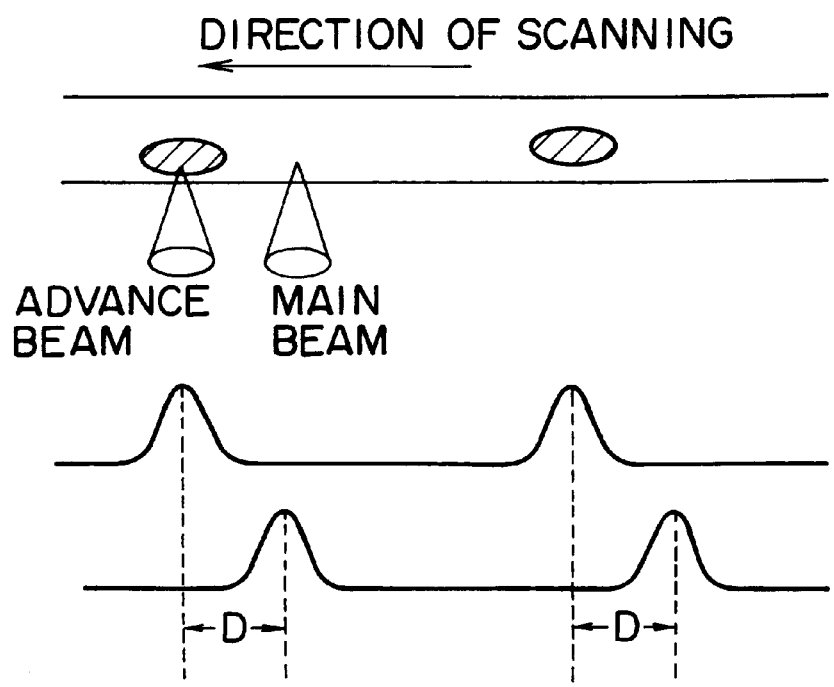
FIG. 10 is a diagram showing the interval D between the advance beam and the main beam in the disc drive apparatus in this mode of implementation.

As method of time correction between the advance beam and the main beam in the controller 6, for instance, the interval D between the advance beam and the main beam as illustrated in FIG. 10 is measured in advance using a specific disc at the time of manufacturing the disc drive apparatus in this mode of implementation in terms of reference pits or otherwise, and stored in a memory or the like. This, for instance in the case of the CLV system whereby the linear speed of revolution control of the disc drive apparatus is kept constant, enables the interval D between the advance beam and the main beam to be readily converted into the correction time because the line density is constant.

Or, in the case of the zone CAV system, for example, whereby the revolution control of the disc drive apparatus is kept constant zone by zone in terms of angular speed, it is also possible to readily convert the interval D between the advance beam and the main beam into the correction time because the address of the disc area in which to execute writing or playback and the linear density of that disc area can be found out.

Incidentally, it is possible to measure, even when the disc drive apparatus is being used, the interval between the main beam and the advance beam of the optical pickup 4 by, for instance, utilizing the time of chucking the disc 1 or blank time, and the accuracy can be improved in this case.

Another method of correction for the laser control section 5 by the controller 6 is to determine a correction level L (L=L2/L1) from the level L1 obtained from an MO signal or an RF signal detected when dust or the like is not stuck to the disc 1 and the level L2 obtained when dust or the like is stuck to the disc 1, and to correct with this correction level L the laser output power for recording, emitted as main beam from the optical pickup 4 during recording, the laser output power for deleting data on the disc 1, performed before recording operation, and the laser output power for playback, emitted as main beam from the optical pickup 4 during playback, to make them reach a prescribed level.

Thus, if the disc drive apparatus is of an analog type for instance, a delay line or the like is provided in the controller 6, and time correction may be accomplished with this delay line and, at the same time, the laser control section 5, which controls the laser output power of the optical pickup 4, may be corrected in accordance with the correction level L.

Or, if the disc drive apparatus is of a digital type for example, the correction level L may be sampled on a clock-by-clock basis, and delayed by a delay time D to correct the laser control section 5.

However, since it is necessary to optimize for each disc drive apparatus the level of the laser output power to be emitted as main beam from the laser light source $4a_1$ of the optical pickup 4 during recording or playback relative to the correction level L generated from the advance beam of the disc drive apparatus, it is more desirable basically to measure in advance for each disc drive apparatus the relationship between the correction level L and the correction quantity of the laser output level, and provide in the controller 6 the relationship between the correction level L and the correction quantity of the laser output level as conversion table.

Figure 11:
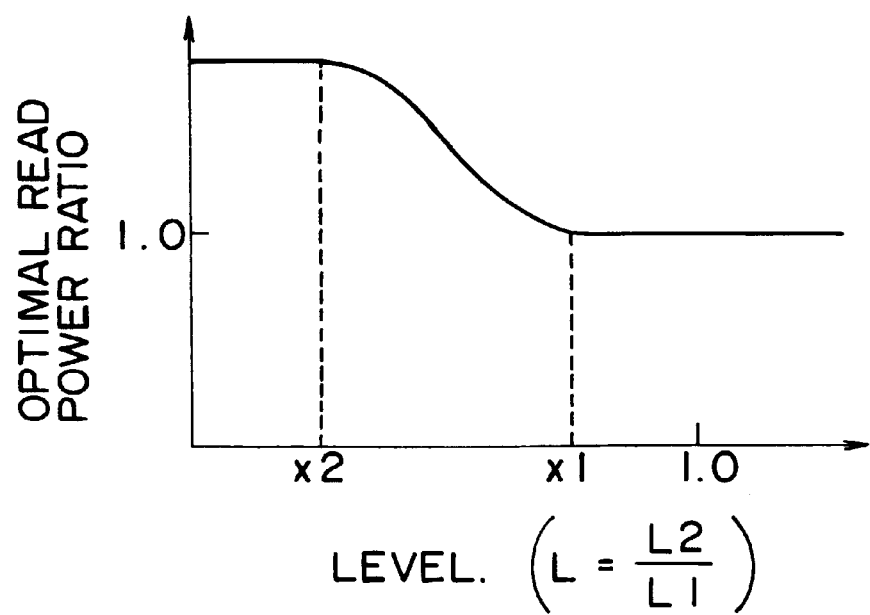
FIG. 11 is a diagram showing the relationship between the correction level L obtained from the advance beam during playback and the optimal read power of the main beam in the disc drive apparatus system in this mode of implementation.

FIG. 11 shows the relationship between the correction level obtained from the advance beam during playback and the optimal read power in a certain disc drive apparatus system. If, for instance, no read error occurs when the collection level L is found in actual measurement greater than X1, the controller 6 may drive the laser control section 5 so as to correct the read power from the time when the correction level becomes smaller than X1.

Or if, for example, no improvement in error rate can be expected even though the read power is corrected when the correction level L becomes smaller than X2, correction of the read power may be dispensed with.

Thus, in the disc drive apparatus in this mode of implementation, it is so disposed that the level of the MO signal or the RF signal be detected from the disc 1 with the advance beam, and the laser output power emitted from the main beam during recording or playback be corrected with the timing at which the main beam passes the area corresponding to the correction level detected by the advance beam. It is thereby made possible, if dust or the like is stuck to the surface of the disc 1, to correct the laser output level in real time according to the extent of sticking of dust or the like to the disc 1 to prevent the influence of dust or the like from inviting write errors or read errors by carrying out correction consisting of raising the laser output power of the main beam only in the vicinity of stuck dust.

Incidentally, in this mode of implementation, the optical pickup 4 is provided with laser light sources $4a_1$ and $4a_2$ capable of emitting the advance beam and the main beam independently and the detectors 4d and 4e for respectively detecting the reflected lights of the advance beam and the main beam, but it is not necessarily required to provide the optical pickup 4 with an independent laser output function for outputting the advance beam, and it is possible, for instance, to divide the light spot of the main beam by a grating or the like and, if the optical system is of a type to form a sub-beam, to use this sub-spot as advance beam. Of course, this sub-beam may be used for tracking servo as in the tracking control of the so-called there-spot system.

However, in such an optical system in which a grating is provided, as it uses the sub-spot as advance beam and, if the laser output power of the main beam is corrected in accordance with the level detection result for the advance beam, the laser output power of the advance beam will also vary accordingly, it is necessary to correct the level of MO signals or RF signals generated by the I/V conversion matrix amplifier 31 from the reflected light of the advance beam correspondingly to the correction of the laser output power of the main beam. Thus, when the read power of the optical pickup 4 is corrected in accordance with the optimal power ratio shown in FIG. 11, the controller 6 drives the laser control section 5 so as to correct the level of MO signals or RF signals generated by the I/V conversion matrix amplifier 31 from the reflected light of the sub-spot by (1/optimal power ratio).

Incidentally, since dust or the like heavy enough to invite read errors or write errors does not stick to the disc 1, the controller 6 may suspended level detection by the sub-spot while the read power is being corrected.

Furthermore, while the correction level is obtained from the level of the MO signal or the RF signal generated by the I/V conversion matrix amplifier 31 in this mode of implementation, it is also possible, for instance, to generate a push-pull signal with the I/V conversion matrix amplifier, and detect the correction level from the push-pull signal.

Furthermore, though the foregoing description of this mode of implementation referred to the operations of recording or playback on MO discs in the disc drive apparatus, it is also possible to apply similar correction to phase change discs (PC discs) and ROM discs.

Figure 12A:
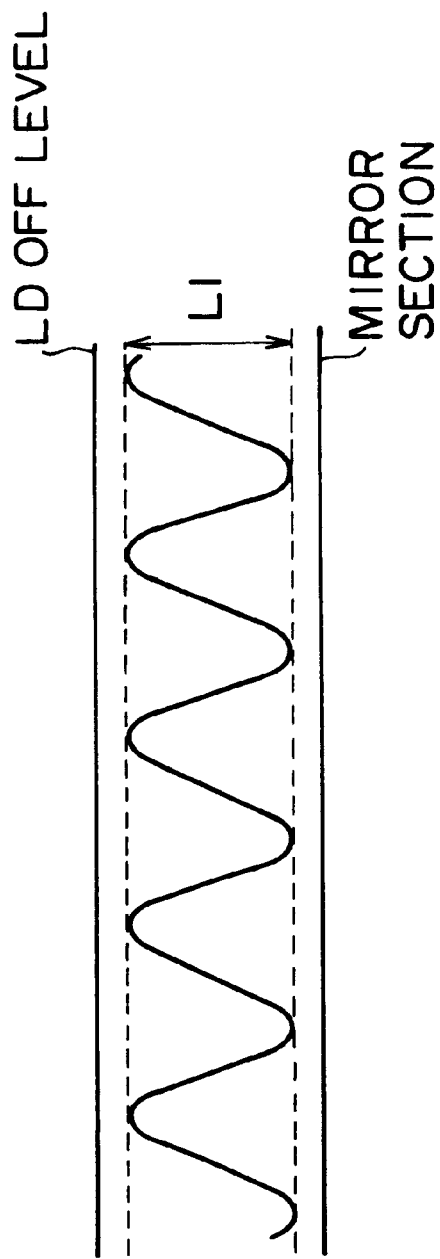
FIGS. 12A and 12B are diagrams showing the waveforms of an RF signal generated from the advance beam when playing back a PC disc with this disc drive apparatus in this mode of implementation.
Figure 12B:
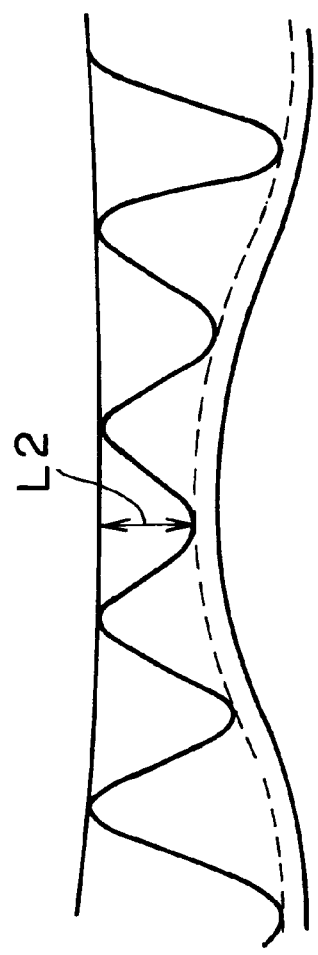

FIGS. 12A and 12B show the waveforms of an RF signal generated by the I/V matrix amplifier 31 on the basis of reflected light of the advance beam, emitted from the optical pickup 4 when playing back a PC disc, FIG. 12A showing the waveform of the RF signal when dust or the like is not stuck to the PC disc and FIG. 12B, that of the RF signal when dust or the like is stuck to the PC disc.

In playback operation, an RF signal generated by the I/V conversion matrix amplifier 31 when no dust or the like was stuck to the PC disc was observed to have an amplitude level L1 as shown in FIG. 12A.

On the other hand, an RF signal generated by the I/V conversion matrix amplifier 31 when dust or the like was stuck to the PC disc was observed to be reduced to L2 in amplitude level by the influence of dust stuck to the surface of the PC disc as shown in FIG. 12B.

Or in recording operation, an RF signal generated by the I/V conversion matrix amplifier 31 when dust or the like was not stuck to the PC disc was observed to have a similar waveform to the RF signal in recording on an MO disc as shown in FIG. 5 above.

Thus, for PC discs as well, it is possible to assess the disc state as to whether or not dust, smear or the like is stuck to the disc 1 by detecting the amplitude level of an RF signal generated by the I/V conversion matrix amplifier 31.

Furthermore, when an ROM disc is played back with this disc drive apparatus, an RF signal generated by the I/V conversion matrix amplifier 31 on the basis of the advance beam emitted from the optical pickup 4 was observed to have a similar waveform to that shown in FIG. 12 above.

As a result, in this mode of implementation, when playing back an ROM disc or recording on or playing back a PC disc, as in the case of an MO disc, it is made possible to correct the laser output level in real time according to the extent of sticking of dust or the like to prevent the influence of dust or the like from inviting write errors or read errors.

To add, in this mode of implementation, in deleting operation for the disc 1 as well, since it is possible to assess the disc state as to whether or not dust, smear or the like is stuck to the disc 1 by detecting the level of an RF signal or an MO signal obtained from the advance beam, the influence of dust or the like can be prevented from inviting faulty deletion, if any dust or the like is stuck to the disc 1, by raising the output level of laser for deleting magnetic field data on the disc 1.

As hitherto described, as the disc drive apparatus according to the present invention is provided with the second light beam means for forming the second light spot in a position ahead of the first light spot of the first light beam means for performing recording, playback or deletion on a disc-shaped recording medium to detect the surface state of the disc-shaped recording medium, and the surface state of the disc-shaped recording medium can be detected on the basis of the light reception output of this second light beam means, it is made possible to correctively control the laser output of the first light beam means to reach a level matching the surface state at the timing of passing a certain position (e.g the position of dust adhesion or the like) detected by the disc state detecting means on the disc-shaped recording medium, and to execute accurate recording and playback operations without being affected by dust or the like stuck to the surface of the disc-shaped recording medium.

Especially where the thickness of the disc-shaped recording medium is thinned and the influence of dust or the like becomes greater, the invention is considered highly suitable.

Moreover, as the light reception information of the second light beam means is supposed to be information corresponding to magnetic field information formed on the disc-shaped recording medium or reflected luminous energy information resulting from reflection by the disc-shaped recording medium, it can be realized in a simple configuration.

Furthermore, by providing the level control means with a conversion table to keep the laser output of the first beam means at the respectively optimal level in recording, playback or deleting operation, corrective control of the optimal level can be readily accomplished.

There is the further advantage that, if the first light beam means and the second light beam means are composed of one laser beam emission source and spectral means for dividing the laser beam from this laser beam emitting source into the first and second light spots, there will be no need to provide an independent laser output function to detect the surface state of the disc-shaped recording medium, it can be realized in a simple configuration.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A disc drive apparatus for performing recording, playback or deletion on a disc-shaped recording medium, comprising:

first light beam means for forming a first light spot for performing recording, playback or deletion on a disc-shaped recording medium;

second light beam means for forming a second light spot in a scanning position ahead of said first light spot to detect the surface state of the disc-shaped recording medium;

disc state detecting means for detecting the surface state of the disc-shaped recording medium on the basis of reception information on the reflected light of the second light beam means; and level control means for correcting the laser output level of said first light beam means with a difference in the timing of scanning of the disc-shaped recording medium by said first light spot and said second light spot according to the surface state of the disc-shaped recording medium detected by the disc state detecting means.

2. A disc drive apparatus, as claimed in claim 1, wherein the reception information on the reflected light of said second light beam means is information corresponding to information on a magnetic field formed on the disc-shaped recording medium.

3. A disc drive apparatus, as claimed in claim 1, wherein the reception information on the reflected light of said second light beam means is information on the quantity of light reflected by the disc-shaped recording medium.

4. A disc drive apparatus, as claimed in claim 1, wherein said level control means has a conversion table for showing the amount of compensation of the laser output level corresponding to said surface state to ensure the respective optimal level for the laser output of said first light beam means in recording, playback or deleting operation.

5. A disc drive apparatus, as claimed in claim 1, wherein said first light beam means and said second light beam means each comprise one laser beam emitting source and spectral means for dividing the laser beam from this laser beam emitting source.

6. A disc drive apparatus, as claimed in claim 5, further comprising means for compensating the detection level of said disc state detecting means when said level control means correctively controls the laser output of said first light beam means.

7. A disc drive apparatus, as claimed in claim 5, further comprising means for stopping detection operation of said disc state detecting means when said level control means correctively controls the laser output of said first light beam means.

* * * * *